US009662977B2

(12) United States Patent
Kapuria et al.

(10) Patent No.: US 9,662,977 B2
(45) Date of Patent: May 30, 2017

(54) DRIVER STATE MONITORING SYSTEM

(75) Inventors: Anuj Kapuria, Gurgaon (IN); Deepak Chandra Bijalwan, Gurgaon (IN); Raghubansh Bahadur Gupta, Gurgaon (IN)

(73) Assignee: HI TECH ROBOTIC SYSTEMZ LTD., Gurgaon (IN)

( * ) Notice: Subject to any disclaimer, the term of this patent is extended or adjusted under 35 U.S.C. 154(b) by 659 days.

(21) Appl. No.: 12/811,422

(22) PCT Filed: Jan. 2, 2009

(86) PCT No.: PCT/IN2009/000007
§ 371 (c)(1),
(2), (4) Date: Oct. 6, 2010

(87) PCT Pub. No.: WO2009/084042
PCT Pub. Date: Jul. 9, 2009

(65) Prior Publication Data
US 2011/0037595 A1     Feb. 17, 2011

(30) Foreign Application Priority Data
Jan. 2, 2008   (IN) ................................ 12/DEL/2008

(51) Int. Cl.
G08B 23/00    (2006.01)
B60K 28/06    (2006.01)

(52) U.S. Cl.
CPC .................................. B60K 28/066 (2013.01)

(58) Field of Classification Search
CPC .................................................... G08B 21/22

USPC ...... 340/573.1, 575, 576; 180/272; 382/103; 701/36, 45

See application file for complete search history.

(56) References Cited

U.S. PATENT DOCUMENTS

| 6,049,747 | A | * | 4/2000 | Nakajima et al. .............. 701/45 |
| 6,094,498 | A | | 7/2000 | Okumura |
| 6,717,518 | B1 | * | 4/2004 | Pirim et al. .................... 340/576 |

(Continued)

FOREIGN PATENT DOCUMENTS

JP     2003308533 A     10/2003

OTHER PUBLICATIONS

International Search Report and Written Opinion of the International Searching Authority for International application No. PCT/IN2009/0000007, mailed May 20, 2009.

*Primary Examiner* — Quan-Zhen Wang
*Assistant Examiner* — Israel Daramola
(74) *Attorney, Agent, or Firm* — JCIP; Joseph G. Chu

(57) ABSTRACT

A Driver State Monitoring System prevents any casualty on the road because of drowsiness while driving. It is an in-vehicle, vision-based electronic system for automobiles. It utilizes a camera installed on the vehicle facing towards the driver. It captures the edge-based face features of the driver. Thereafter, the real time image processor extracts the desired image from the image and estimates the correct position of the eye, the nose and the head orientation of the driver's face based on the predetermined values. The signal generator generates a warning signal when there is any abnormality detected based on the output of the status examination result generated by the real time image processor. These signals can be can be an acoustic signal, a videft signal, a photonic signal or a haptic signal.

10 Claims, 2 Drawing Sheets

(56) References Cited

U.S. PATENT DOCUMENTS

| | | | |
|---|---|---|---|
| 6,927,694 B1 | 8/2005 | Smith et al. | |
| 7,202,792 B2 | 4/2007 | Zhang et al. | |
| 7,515,054 B2 * | 4/2009 | Torch | 340/573.1 |
| 7,835,834 B2 * | 11/2010 | Smith et al. | 701/36 |
| 7,868,771 B2 * | 1/2011 | Yamada et al. | 340/575 |
| 8,184,856 B2 * | 5/2012 | Smith et al. | 382/103 |
| 8,196,694 B2 * | 6/2012 | Biondo et al. | 180/272 |
| 2004/0070509 A1 * | 4/2004 | Grace et al. | 340/575 |
| 2004/0183685 A1 * | 9/2004 | Strumolo et al. | 340/575 |
| 2007/0120691 A1 | 5/2007 | Braun | |
| 2007/0222617 A1 * | 9/2007 | Chai | B60W 40/09 340/573.1 |
| 2010/0253526 A1 * | 10/2010 | Szczerba et al. | 340/576 |
| 2011/0068934 A1 * | 3/2011 | Weng et al. | 340/575 |

\* cited by examiner

DRIVER STATE MONITORING SYSTEM

FIELD OF THE DISCLOSURE

The present disclosure describes a driver state monitoring system to prevent any casualty on the road because of drowsiness/distracted-ness while driving.

BACKGROUND OF THE DISCLOSURE

Driver fatigue is a significant factor in a large number of road accidents. The recent statistical data shows annually 1,200 deaths and 76,000 injuries are attributed to fatigue related accidents.

The development of technologies for detecting and preventing casualties because of drowsiness at the wheel is a major challenge in the field of accident avoidance systems. Hence, there is a need exists to create a driver state monitoring system to prevent any such casualty on the road.

SUMMARY OF THE DISCLOSURE

The present disclosure describes a driver state monitoring system to prevent any casualty on the road because of drowsiness/distracted-ness while driving. It is an in-vehicle, vision-based electronic system for automobiles. It utilizes a camera (color, black & white, NIR, IR) installed on the vehicle facing towards the driver. It captures the edge-based face features of the driver. Thereafter, the real time image processor extracts the desired image from the acquired image and estimates the correct position of the eye, the nose and the head orientation of the driver's face based on certain criteria.

Further, the signal generator generates a warning signal when there is any abnormality detected based on the output of the status examination result generated by the real time image processor. These signals can be can be an acoustic signal, a video signal, a photonic signal or a haptic signal.

BRIEF DESCRIPTION OF THE DRAWINGS

The present disclosure explains the various embodiments of the instant invention with reference to the accompanying drawings present in the following description.

DETAILED DESCRIPTION OF THE DISCLOSURE

Figure 1:
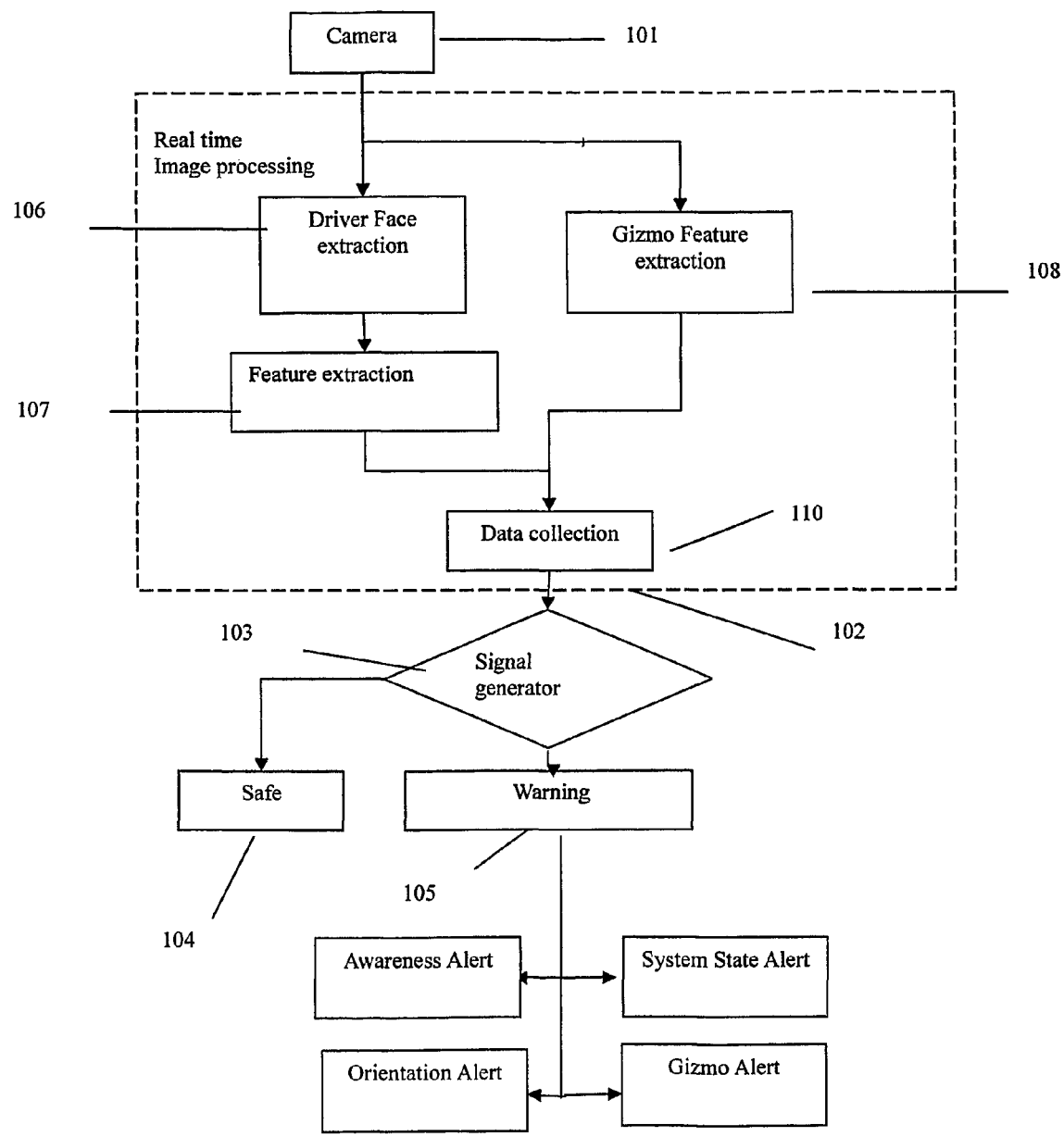
FIG. 1 illustrates a block diagram showing the schematic construction of the Driver State Monitoring System according to an embodiment of the present disclosure.

The embodiments of the present disclosure will be described in detail with reference to the accompanying drawings. However, the present disclosure is not limited to the embodiments and the embodiments described herein in the art of the present disclosure. The disclosure is described with reference to specific circuits, block diagrams, signals, etc. simply to provide a more thorough understanding of the disclosure. The detailed description of the disclosure is as follows:

FIG. 1 illustrates a block diagram of a Driver State Monitoring System. A camera 101 is installed on the vehicle facing towards the driver face and takes the face features images of the driver's face. The real time image processing system 102 computes the face features by extracting the face features and checks the status of the eye position and the nose position for the driver. It also checks the head orientation position of the driver. Depending upon the computation result different audio-visual or audio only or visual only signals or haptic signals are generated by a signal generator 103. If there is no change in the position of the extracted features a safe signal 104 is generated, and if a change is detected then a warning signal 105 such as awareness alert signal, orientation alert, system state alert and gizmo alert signal is generated.

Further, the real time image processing means consists of a driver face extraction block 106, a feature extraction block 107, a gizmo extraction block 108 and a data collection or storing block 110.

Figure 2:
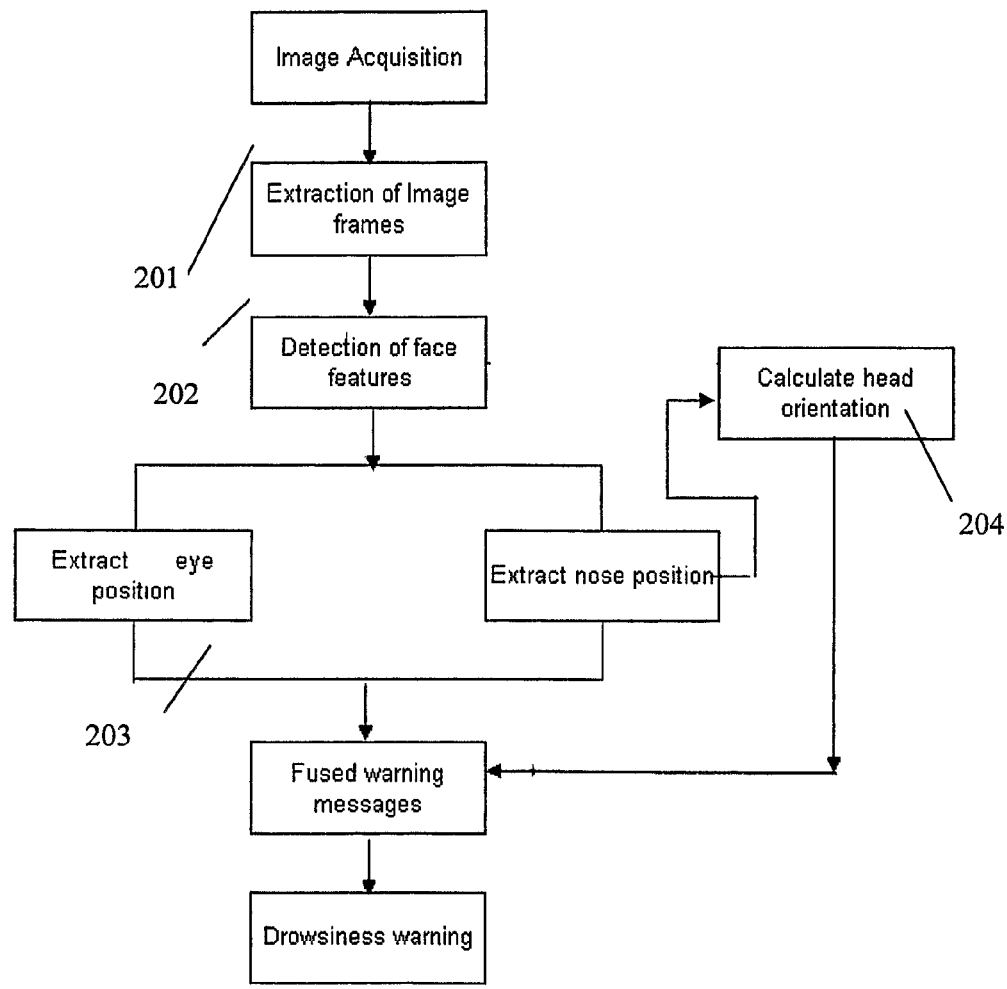
FIG. 2 illustrates a block diagram showing the driver state monitoring process according to an embodiment of the present disclosure.

FIG. 2 illustrates a block diagram showing the image extraction and image filtering process. As illustrated in FIG. 1 the driver state monitoring system consists of a camera 101 which captures the images of the driver's face. The camera is connected to the real time image processing means that computes the edge-based face feature extraction and processing in the step 201. The input image is first subjected to pixel-by-pixel spatial filtering operations using kernels of 5×5 to detect edges in four directions—horizontal, +45 degree, vertical and −45 degree. The Edge flag of a pixel denotes the orientation of that pixel in any of the four directions. The 64-dimension feature vector is generated from the feature vector by taking the spatial distribution histogram of edge flags. In the image every block of 64×64 is considered for template matching with the training sample. The best matching block contains the face. The matching is carried out using Manhattan distance as dissimilarity measure. Thus the face is detected in the step 202.

Further, in the step 203 the extraction of the face features such as eye position and the nose position of the driver is performed. The eye is detected from the rectangular face block of the whole image. Geometrically four lines are drawn inside the rectangle that includes the eye. The calculation of the eye position is done based on the Statistical features of image like Histogram, Mean of Gray scale and Standard Deviation.

Further the filtering process of the extracted image is done by applying Sharpening Filter and Histogram Equalization. The correlation coefficient, slope angle and the nature of the contour identifies the status of the eye whether it is closed or open.

Similarly the extraction of the driver's nose position is executed by extracting the image block from the frame that contains Nose. A spatial filter detects the two nostrils. For the verification of two points, the distance between those points are measured. The distance between the nostrils should have a minimum and maximum distance. The middle point of the two nostrils is considered as the Nose tip.

In the step 204 the driver head movements and orientation are calculated by checking the position of the nose tip which is initialized by taking the mean position of nose tips in first 10 frames. Since the nose tip is unique in the face so tile orientation and movement of the face can be monitored by the movement of the nose tip. After initialization of the nose position, in the subsequent frames, the current position of the nose tip indicates movement of the head.

If the driver's face features and head orientation is detected on their actual position then the signal generated by the signal generating means 103 generates a safe signal 104. But if the driver is found in the drowsiness condition then all face features and head orientation position will be displaced from their actual position and in such a case a warning signal 105 is generated such as such as awareness alert signal, orientation alert, system state alert and gizmo alert signal depending upon the kind of change detected. The warning signal can be an acoustic signal, a video signal, a photonic signal or a haptic signal.

The Driver State Monitoring System generates a warning signal if the driver is feeling drowsy, talking on a mobile device, if face is not oriented in front direction or any gadgets are in camera view. This system is also applicable to, all personal/commercial vehicles (car, truck, passenger transport, heavy trucks etc.).

Although the disclosure of the instant invention has been described in connection with the embodiment of the present disclosure illustrated in the accompanying drawings, it is not limited thereto. It will be apparent to those skilled in the art that various substitutions, modifications and changes may be made thereto without departing from the scope and spirit of the disclosure.

We claim:

1. A Driver State Monitoring system, the system comprising:
    an image acquisition means using a single camera for acquiring an image of a vehicle driver;
    a real time image processing means working independently of the environmental and illumination conditions, includes an extraction means to extract the driver face from said acquired image;
    a processor for processing the correct position of eye and nose tin, wherein the position of the nose tip is determined based on position of two nostrils using spatial filters; and
    an estimation means for determining the status and position of eye, nose tip and head orientation; and
    a signal generator means for generating an output signal based upon a signal generated by the real time image processing means.

2. The Driver State Monitoring system as claimed in claim 1, wherein the extraction means extracts a set of driver face features edge-based and pixel direction based features of the acquired driver's face image to generate a feature set database.

3. The Driver State Monitoring system as claimed in claim 1, wherein the estimation means determines the following status:
    driver's eye status including whether at least one of the driver's eyes is open or closed;
    nose tip; and
    head orientation.

4. The Driver State Monitoring system as claimed in claim 1, wherein the signal generator means generates a warning signal when there is any abnormality detected based on the output of the estimation means.

5. The Driver State Monitoring system as claimed in claim 4, wherein the warning signal is an acoustic signal or a video signal or a photonic signal or a haptic signal.

6. A Driver State Monitoring method, the method comprising;
    acquiring an image of a vehicle driver using a single camera;
    extracting the eye and nose tip images;
    processing the correct position of the eye and nose tip on the driver's face, wherein the position of the nose tip is determined based on position of two nostrils using spatial filters;
    estimating the status and position of eye, nose tip and head orientation based on edge-based and pixel direction features;
    generating an output signal based upon an estimated signal.

7. The Driver State Monitoring system as claimed in claim 3, wherein said driver's eye status determination comprises detecting eye location using template based matching.

8. The Driver State Monitoring system as claimed in claim 7, wherein said driver's eye status determination comprises using the resultant output of a sharpening filter, histogram equalization and estimation of correlation coefficient, slope and contour extraction.

9. The Driver State Monitoring system as claimed in claim 3, wherein determining said status of nose tip and head orientation comprises using spatial filtering operations and detection of head orientation by actively tracking the nose tip.

10. A driver state monitoring system, the system comprising:
    a camera situated for acquiring an image of at least a head of a vehicle driver;
    at least one processor configured to:
        process an image from the camera in real time,
        extract information regarding a face of the driver in the image from the camera oven, and
        determine whether a position of at least one eye of the driver and a nose tip of the driver indicate that a driver head orientation corresponds to the driver focusing on driving the vehicle, wherein the position of the nose tip is determined based on position of two nostrils using spatial filters; and
    a signal generator configured to provide an output based upon an indication from a controller that the driver head orientation does not correspond to the driver focusing on driving the vehicle.

* * * * *